United States Patent [19]
Milo

[11] 4,245,465
[45] Jan. 20, 1981

[54] GAS TURBINE ENGINE LUBRICATION SYSTEM INCLUDING THREE STAGE FLOW CONTROL VALVE

[75] Inventor: George T. Milo, Bridgeport, Conn.

[73] Assignee: Avco Corporation, Stratford, Conn.

[21] Appl. No.: 71,230

[22] Filed: Aug. 30, 1979

[51] Int. Cl.³ .............................................. F02C 7/06
[52] U.S. Cl. .................................. 60/39.08; 184/6.11
[58] Field of Search ....................... 60/39.08; 184/6.11

[56] References Cited

U.S. PATENT DOCUMENTS

| 2,996,146 | 8/1961 | Beam et al. | 184/6.11 |
| 3,769,790 | 11/1973 | Thebert | 60/39.08 |

FOREIGN PATENT DOCUMENTS 702551 1/1965 Canada ................................ 60/39.08

Primary Examiner—James J. Gill
Attorney, Agent, or Firm—Ralph D. Gelling

[57] ABSTRACT

A lubrication supply system for providing lubricant to the bearings and the gear box assemblies of a gas turbine engine includes a three stage poppet control valve means interposed between the source of pressurized lubricant and the bearings. The control valve is responsive to the engine speed which determines the level of pressurization of the pressurized lubricant. The control valve by-passes all lubricant to a sump below a selected speed, opens a first passage to the bearings, etc. during idling speed and, modulates the opening of a second passage to the bearings, etc., at speeds above idling.

3 Claims, 5 Drawing Figures

GAS TURBINE ENGINE LUBRICATION SYSTEM INCLUDING THREE STAGE FLOW CONTROL VALVE

The subject invention relates to a lubrication supply system for a bearing or gear box assembly of a gas turbine engine, and more particularly, a lubrication supply system including a three stage flow control valve for programming the flow of lubricant to the bearings as a function of the engine speed thereby minimizing oil leakage from the bearing package and engine smoking at shutdown of the gas turbine engine. Still further, the subject invention relates to a unitary three stage control valve which is specifically adapted for use on aircraft gas turbine engines where size and weight are of the utmost importance, and to an advanced flow control system, which will perform three separate and distinct functions in a single valve unit.

Lubricant in a gas turbine engine serves the two fold purpose of cooling and lubricating the bearings and gear box assemblies. A pressurized lubrication system carries the lubricant, such as oil, directly to the points where it is needed. Lubricant is pumped into the bearing housing or package, sprayed onto the bearing, and is subsequently collected at the bottom of the bearing package to be drained through suitable scavenging conduits back to the source of the pressurized lubricant. Depending on the application, scavenging drainage can be accomplished in various ways, for example, gravity, additional pumps, or bleeding high pressure air through the seals of the bearing package. In general, gravity may be used where there is sufficient room in the engine to allow for a large drainage area to insure that all of the lubricant flow can be drained from the bearing package. However, in more advanced high speed gas turbine engines, drinage or scavenging is impaired by the necessity of using passageways having small cross-sectional areas and thus problems begin to arise as the engine speed increases and the flow of lubricant to the bearing package is greater than the capability of the scavenging system. High pressure air may be used to assist in scavenging of the lubricant flow, with the high pressure air generally being provided from the compressor stage of the engine for pressurization of the bearing package. The latter creates a force to improve the flow of draining oil from the bearing package, and it has been found that this methd is effective at high speeds to maintain the desired drainage flow to correlate with the flow of pressurized lubricant provided to the bearing package. Nonetheless, this method has a disadvantage in that under idle or shutdown conditions of the engine, the pressurized air available from the compressor is substantially reduced, while the pressurized lubricant flow to the bearing package is still operating at relatively high flow levels. The result of this condition is an undesirable build-up of lubricant in the bearing package.

In the lubrication system disclosed in U.S. Pat. No. 4,170,873 issued Oct. 16, 1979, which is assigned to the assignee of the subject application, a positive displacement pump circulates oil from a sump to the accessory gears and the support bearings and splines of the shaft of the turbine engine. In order to compensate for the deficiency of the high pressure air available in the bearing package during engine idle and shutdown conditions, at which time the oil flow to the bearing package remains relatively high, a bypass duct is provided to return the excess oil flow to the sump. The orifice of the duct is designed to gradually close as the pump discharge pressure increases and to dump excessive oil flow under oil pressures corresponding to the idle condition of the engine. This same excessive oil flow condition occurs after engine shutdown and to avoid the effect thereof, a second valve in the form of a check valve is inserted in the main oil duct to shut off all oil flow when the oil pressure declines below a specific value. Accordingly, two separate and distinct control valves are provided, and an arrangement of this type is quite acceptable for a gas turbine engine where space is not a problem. However, such an arrangement is too bulky for use on an aircraft engine where size and weight are of utmost importance. In addition, the provision of two separate control valves increases the vulnerability of the lubrication system to potential damage from outside forces, such as shrapnel, when the lubrication system is employed in a military aircraft.

Accordingly, it is the object of the subject invention to provide, in a single control valve, a mechanism for achieving programmed lubrication flow to a bearing package in a gas turbine engine as a function of the operating conditions of the engine.

It is a further object of the invention to provide an advanced flow lubrication system which will perform the following functions in a single unit: (a) reduce the flow of lubricant to a bearing at idle (programming valve function); (b) shut-off the flow of lubricant when the engine speed is at or below 20% compressor speed (check valve function); and (c) regulating the lubricant flow at and above 85% compressor speed (regulating valve function).

These and other advantages are achieved by the system of the subject invention wherein a programmable, three stage control valve is interposed between the source of pressurized lubricant and the bearing package to be lubricated. The source of pressurized lubricant includes an oil reservoir, the output of which is pressurized by a positive displacement pump which is driven by the gas turbine engine shaft. A bypass conduit extends between the control valve and the oil reservoir. The control valve may be a multi-poppet valve including an arrangement of a coaxial start-up poppet and modulating poppet. The spring-biased start-up poppet is responsive to the level of pressurization of the oil (and hence the engine speed) and controls the flow of oil from the pressurized source through a first aperture leading to the bearing package. The position of the spring-biased modulating poppet is also a function of the engine speed, and controls the flow of excess oil through second and third apertures which are provided in the control valve and which are in communication with the bypass conduit. By this arrangement, the three stage valve functions to completely cut-off the flow of lubricant to the bearing package when the gas turbine engine is operating below 20% compressor speed as, for example, at shut down of the engine. Above 20% and at idle power, the start-up poppet and modulating poppet are actuated by the pressurized lubricant such that the first aperture, as well as the second aperture, in the control valve are uncovered thereby allowing controlled flow of lubricant to the bearing package and a limited flow to the bypass conduit. At maximum operating speed, the start-up and modulating poppets are fully actuated so as to provide flow through the first and third apertures, with the pressure relief flow of the lubricant through the third aperture ensuring that the lubricant flow to the bearing package is maintained at desired maximum level. Accordingly, the subject system, by the provision of a single three-stage control valve, ensures that the desired controlled flow of oil is provided to the bearing package, thereby precluding oil leakage and smoking from the package, while reducing the size and weight of the system, as well as its vulnerability to potential damage from outside forces such as shrapnel.

The above and other objects and advantages of the invention will become apparent from a reading of the following detailed description taken in conjunction with the drawings in which.

Figure 1:
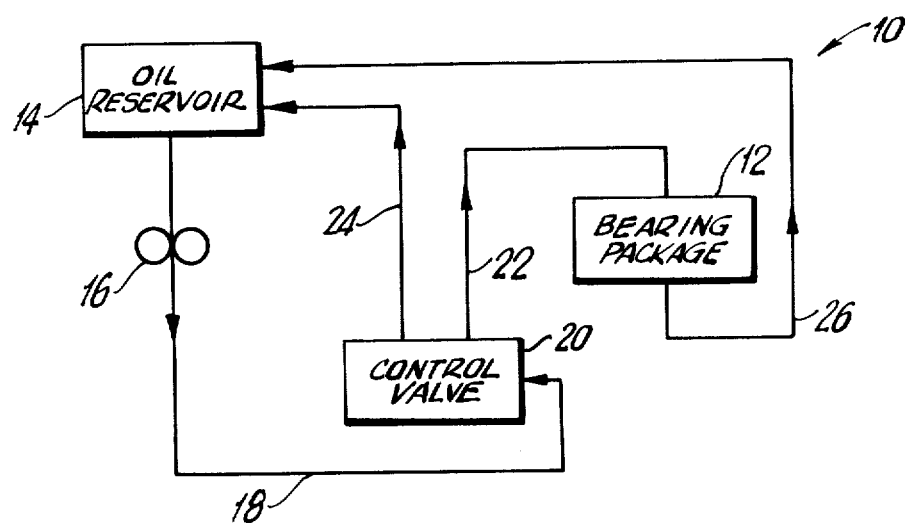
FIG. 1 is a simplified schematic flow diagram of the lubrication supply system of the subject invention.
Figure 2:
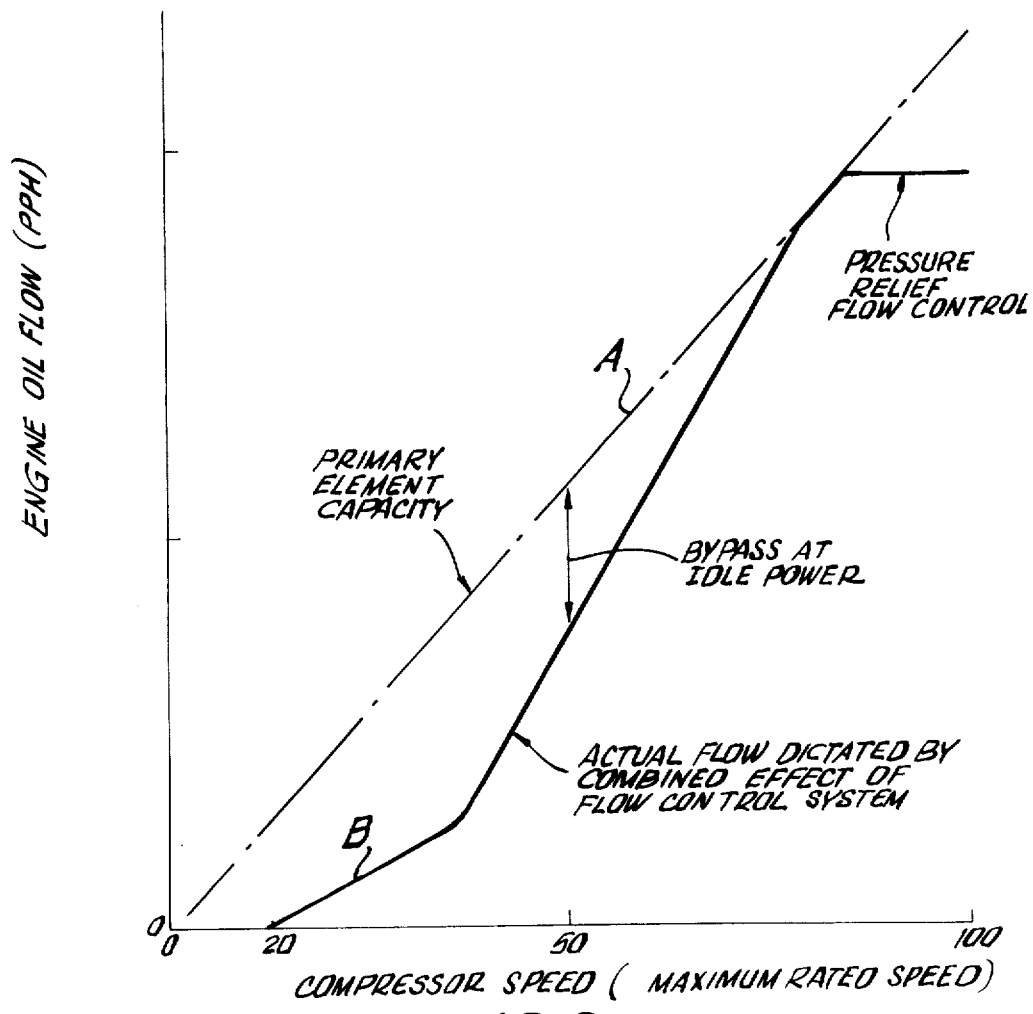
FIG. 2 is a graph showing the lubrication flow characteristics as a function of the compressor speed of a gas turbine engine of a system employing the subject invention.

Referring to FIG. 1, the lubrication system of the subject invention is generally designated by the numeral 10, and is adapted to be embodied in an advanced gas turbine engine including, for example, a bearing package 12 for the main shaft (not shown) of the engine. The lubricant is circulated from a reservoir 14 within the system 10 by a positive displacement pump 16 which is driven by the shaft of the gas turbine engine. Pump 16 generates an oil flow (PPH) that is directly proportional to the speed of the compressor of the gas turbine engine, as indicated by the dashed line A in the graph of FIG. 2. As shown in FIG. 2, the compressor speed, corresponding to the engine speed, is specified as a percentage of maximum rated speed. It can be observed from the graph of FIG. 2 that there is a substantial oil flow at the idle condition of the engine, which is approximately 50% of full capacity. The source of pressurized lubricant from the reservoir 14 and the positive displacement pump 16 is provided via a conduit 18 to a control valve 20 from which the lubricant is provided via conduit 22 and/or 24 to the bearing package 12 and/or the oil reservoir 14, respectively. Oil scavenged from the bearing package 12 is conducted via a scavenging conduit 26 back to the oil reservoir 14.

As described in U.S. Pat. No. 4,170,873, which issued on Oct. 16, 1979, the bearing package 12 basically consists of a housing, bearings, and suitable shaft seals. Oil entering the housing is dropped or sprayed onto the bearings and thence collects at the lower portion of the housing for drainage through the scavenging conduit 26. In order to aid in the drainage of the lubricating oil, high pressure air is bled from the compressor stages of the gas turbine engine to the bearing package 12, thereby creating a condition where a positive pressure exists within the bearing package and forces air and oil through the scavenging conduit 26. By this arrangement, the lubrication oil in the bearing package 12 is effectively maintained at a desirable level.

However, as noted above, a problem arises when the engine is idling or when it is shut down because, during these periods, there is little or no high pressure air available from the compressor of the engine to provide this scavening function. As an example, at the maximum rated speed of the compressor of a gas turbine engine, the compressor may provide approximately 100 psi of airflow to the bearing package 12, whereas during engine shutdown, when the compressor speed is less than 20% of the maximum rated speed, the compressor may be putting out only 10 psi of airflow to the bearing package 12. Accordingly, at the lower operating speeds of the compressor, there is little or no air pressure for scavenging of the lubrication oil from the bearing package, and thus scavenging is primarily accomplished by the force of gravity. Thus, it is apparent that at the low operating speeds of the gas turbine engine, the amount of lubrication flow to the bearing package 12 should be correspondingly decreased or stopped in order to prevent flooding of oil within the bearing package.

Another problem associated with too much lubricant in the bearing package 12 at low operating compressor speeds or shutdown is the soap back problem. In general, during shutdown, the shaft bearing does not need to be provided with a flow of lubricating oil, it merely needs a film of oil until such time as the engine is totally shut down. During the shutdown operation, if a great amount of oil is trapped in the bearing package 12, it tends to bake, and vaporize, thereby coating the walls of the bearing package with coke, and this coke will eventually lead to jet clogging and subsequent bearing starvation possibly leading to bearing seizure. Soap back occurs when the engine shuts down, and the hot section of the gas turbine engine, such as the compressor, is at a temperature of approximately 1,000° F., and the heat dissipated by the compressor after shutdown is conducted into the bearing package 12. The bearing package under normal operating conditions is at a temperature of approximately 400° F., and thus during the soap back condition, the temperature of the bearing package may increase by 200° F. by virtue of conduction. Accordingly, the temperature of the bearing package is suddenly increased until such time as it can decrease by heat convection. It is at the time that the temperature increases that the oil in the bearing package 12 tends to oxidize and break down, thereby resulting in the coating of the walls and clogging of the oil jets of the bearing package 12. Accordingly, it is an object of the invention to minimize the amount of oil in the bearing package 12 during the shutdown phase of operation of the engine. To this end, the lubrication system 10 includes the control valve 20 which basically includes three operational modes, as shown respectively in FIGS. 3, 4, and 5.

Figure 3:
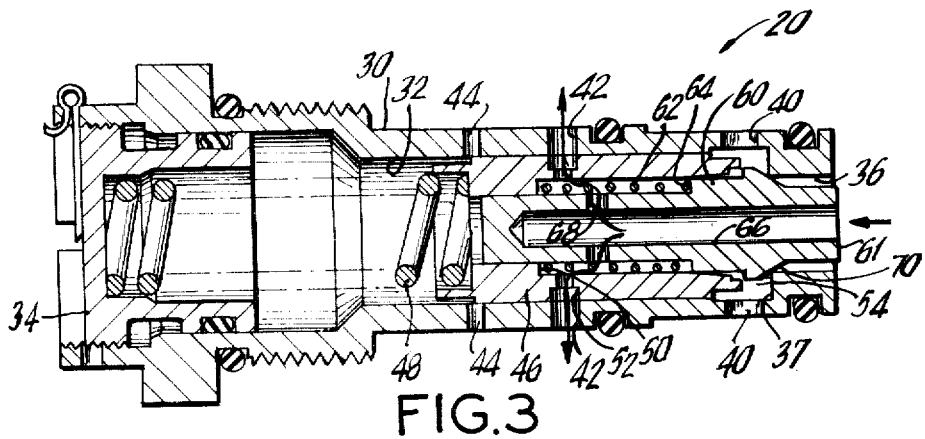
FIG. 3 is a cross-sectional view of the valve control means of the subject system at the operating mode of the gas turbine engine where the compressor speed is less than 20% of maximum rated speed.

Turning to FIG. 3, control valve 20 includes a generally tubular housing 30 having an axial bore 32 which is closed at one end by a threaded plug 34, while the opposite end 36 is open. The conduit 18 extending from the positive displacement pump 16 is connected to the open end 36. Housing 30 includes a first transverse aperture 40 which is in communication with the conduit 22 extending to the bearing package 12. Housing 30 further includes a second transverse aperture 42 and a third transverse aperture 44, with aperture 42 being disposed between apertures 40 and 44. Apertures 42 and 44 are in communication with the bypass conduit 24 extending to the oil reservoir 14 (see FIG. 1). Slidably received within the axial bore 32 of housing 30 is a modulating poppet 46 which is spring-biased by means of springs 48, one end of which bears against the plug 34, while the other end bears against the modulating poppet 46 to bias the latter toward the open end 36 of housing 30. The modulating poppet 46 includes an internal circumferential step 50 as well as an intermediate transverse hole 52 which cooperates with the second and third transverse apertures 42, 44 for by-passing pressurized oil flow through the bypass conduit 24 to the oil reservoir 14, as more fully described hereinafter. The forward edge 54 of the modulating poppet 46 bears against the leading edge portion of the start-up poppet 60, as more fully described hereinafter.

Coaxial with and slidably received within the modulating poppet 46 is the start-up poppet 60 that is spring-biased by means of spring 62 which bears, at one end, against the internal circumferential step 50 of the modulating poppet 46, and at the other end against an internal circumferential surface 64 of the start-up poppet 60. The latter includes an axially extending channel 66 that is in communication with an intermediate transverse hole 68 which, in turn, is in communication with the spacing within which the spring 62 is disposed and with the hole 52 in the modulating poppet 46. The forward end of poppet 60 includes an inclined poppet seat 70 which cooperates with the circumferential inner edge of the inside wall 37 to close off the open end 36 of the housing 30 when the control valve is in the position as illustrated in FIG. 3. Opening 36 is in communication with the conduit 18 (see FIG. 1) extending from the source of pressurized lubricant, i.e., oil reservoir 14 and the positive displacement pump 16. As indicated above, during start-up of the engine, or during a shutdown operation, at which time the compressor speed is below 20% of maximum rated speed, it is desirable that the flow of oil to the bearing package 12 be interrupted, even though the capacity for delivering pressurized flow is increasing linerally, as shown by the dashed line A in FIG. 2. In order to prevent the flow of oil from the source of pressurized flow and through the conduit 22 to the bearing package 12, control valve 20 is designed to completely close off the first transverse aperture 40. This condition is illustrated in FIG. 3, and it is noted that the force generated by the pressurized flow bearing against the frontal surface wall 61 of the start-up poppet 60 is insufficient to overcome the restraining forces of springs 62 and 48, whereby the flow of lubricant through the first transverse opening 40 is prevented. On the other hand, pressurized oil is allowed to flow through the channel 66 in the start-up poppet 60, and thence through the transverse hole 68 to the second transverse aperture 42 for by-passing through the conduit 24 back to the reservoir 14. This condition of the control valve 20, as illustrated in FIG. 3, is maintained until such time as the compressor speed reaches approximately 20% of the maximum rated speed of the gas turbine engine. In addition to functioning to preclude the flow of pressurized lubricant to the bearing package during initial start-up and shutdown of the gas turbine engine, the control valve 20, in the position as illustrated in FIG. 3, insures that a constant flow of pressurized oil passes through the lubrication system 10, and thus the control valve 20 functions at this time as a static check valve. By this arrangement, the oil reservoir 14 may be located above the engine, as schematically illustrated in FIG. 1, without concern as to the leaking of oil from the reservoir 14 into the bearing package 12.

Figure 4:
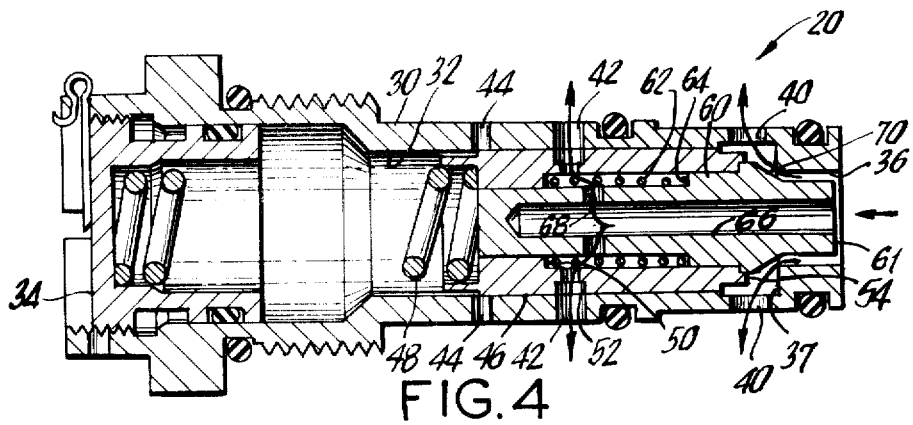
FIG. 4 is a view similar to FIG. 3 but illustrating the position of the control valve during the idle power operation mode of the gas turbine engine.

Referring to FIG. 2, in the operation of the lubrication system 10 of the subject invention, above a compressor speed of 20%, the actual flow of lubricant to the bearing package 12 is designated by the solid line B. As the compressor speed increased above approximately 20% maximum rated speed, the force developed by the pressurized oil against the surface 61 of the start-up poppet 60 is sufficient to overcome the restraining force of spring 62 so as to actuate the start-up poppet 60 to the left, as illustrated in FIG. 4. At such time, the poppet seat 70 is spaced from the inside wall 37 of the open end 36, thereby enabling the flow of pressurized oil to pass through the first transverse aperture 40 to the conduit 22 for delivery to the bearing package 12. At such time, pressurized flow is also provided through the channel 66 and the transverse hole 68, and thence through the second transverse aperture 42 for bypassing via conduit 24 to the oil reservoir 14. As shown in FIG. 2, a differential between the primary element capacity, as shown by dashed line A, and the actual flow rate as shown by solid line B, is present. As the level of the pressurized flow through conduit 18 is increased with increased compressor speed, spring 62 is further compressed, and spring 48 likewise starts to compress.

Figure 5:
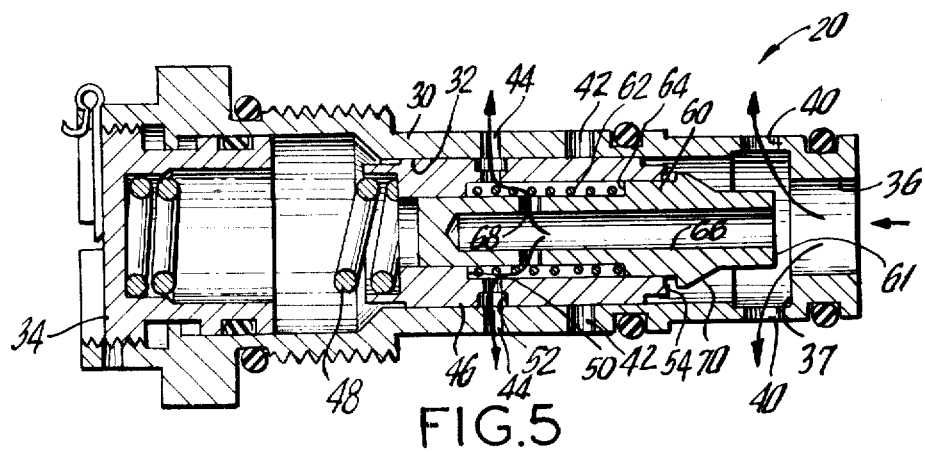
FIG. 5 is a view similar to FIG. 3 but illustrating the position of the control valves at maximum power operation mode of the gas turbine engine.

FIG. 5 illustrates the condition of the control valve 20 during high speed operation of the engine and maximum flow of the pressurized lubricant to the bearing package 12. At such time, springs 62 and 48 are compressed, both the modulating poppet 46 and the start-up poppet 60 are actuated to the left (as shown in FIG. 5), and maximum pressurized flow is delivered via the conduit 18 through the first transverse aperture 40 to the conduit 22 for delivery to the bearing package 12. At the same time, the pressurized flow is delivered via the channel 66 and thence through hole 68 to the third transverse aperture 44 for conducting to the bypass conduit 24 and thence to the oil reservoir 14. The respective apertures and channels of the control valve 20 are designed so as to insure that when the elements of the control valve 20 reach the position as shown in FIG. 5, the amount of flow to the bearing package 12 is maintained at a constant level, as shown in FIG. 2 and designated "Pressure Relief Flow Control".

During engine shutdown from the maximum rated speed, the flow of pressurized lubricant to the bearing package 12 is programmed in the reverse manner to that described above in order to follow the actual flow rate as shown by solid line B in FIG. 2.

Accordingly, there is provided a lubrication system including a single control valve which functions to program the flow of lubricant to the bearing package 12 in a desired manner, and which effectively embodies many operational modes in a single structure. The control valve 20 functions as a static check valve, as well as a control valve to preclude the flow of lubricant to the bearing package during the initial start-up of the engine and also during the shutdown phase of the engine; the control valve maintains the level of flow to the bearing package at a desired flow rate below the maximum capacity of the lubrication system as the engine speed increases through idle up to a maximum; and at the maximum rated speed of the engine, the control valve functions to maintain the rate of flow of lubricant to the bearing package at a constant rate, thereby precluding undesirable flooding of the bearing package.

The present invention has been described in the above specification with reference to a specific embodiment, and such reference has been made for purely illustrative purposes only, and various modifications in the details included therein may be made without departing from the scope or spirit of the invention as defined by the following claims.

What is claimed is:

1. In a gas turbine engine, a lubrication supply system for providing a lubricated part with a programmed flow of lubricant that is a function of the engine speed comprising:

a source of lubricant which is pressurized as a function of the engine speed;

valve means interconnecting said source of pressurized lubricant to the lubricated part; and bypass conduit means providing direct communication between said valve means and said source of pressurized lubricant, said valve means being a multi-poppet valve comprising a housing, said housing being in communication with said source of pressurized lubricant at one end thereof, while the opposite end of said housing is closed; said housing having therein a spring bearing against the closed end of the housing and against a modulating poppet member, urging the modulating poppet member away from the closed end, said housing also containing a start-up poppet member and a spring between the modulating poppet member and the start-up poppet member biasing the start-up poppet member toward said one end of said housing; said housing having first transverse aperture means adjacent said open end and in communication with the lubricated part, with the flow of lubricant through said first aperture means being a function of the position of said start-up poppet member, and second and third transverse aperture means being intermediate the length of the housing and in communication with said by-pass conduit means, with the flow of lubricant through said second and third transverse aperture means being a function of the positioning of said start-up and modulating poppet members; said start-up poppet including an axially-extending channel therein, one end of which is closed while the other end thereof is open and in communcation with the open end of said housing; said start-up poppet including a transverse hole which is alternatively in communication with said second and third transverse aperture means, whereby:

(i) during the start-up and shut-down operation of the engine, lubricant from the source of lubricant passes through the channel in the start-up poppet and thence through the second transverse aperture means to the by-pass conduit means;

(ii) during idle power operation of the engine, lubricant from the source of lubricant causes actuation of the start-up poppet such that lubricant passes through the first transverse aperture means to the lubricated part and also through the second transverse aperture means to the by-pass conduit means; and (iii) during high speed operation of the engine, lubricant from the source of lubricant causes actuation of both the start-up poppet and the modulating poppet such that lubricant passes through the first transverse aperture means to the lubricated part and also through the third transverse aperture means to the by-pass conduit means.

2. In a gas turbine engine, a lubrication supply system for providing a lubricated part with a programmed flow of lubricant that is a function of the engine speed as in claim 1 wherein said source of pressurized lubricant includes a reservoir for storing a quantity of lubricant and a positive displacement pump driven by the shaft of said gas turbine engine and connected to the reservoir to circulate lubricant through the system.

3. In a gas turbine engine, a lubrication supply system for providing a lubricated part with a programmed flow of lubricant that is a function of the engine speed as in claim 1 further including scavenging means provided between the lubricated part and the source of pressurized lubricant.

* * * * *